United States Patent Office 2,786,776
Patented Mar. 26, 1957

2,786,776

SILICA COMPOSITION AND PRODUCTION THEREOF

Edward M. Allen, Doylestown, Ohio, assignor to Columbia-Southern Chemical Corporation, Allegheny County, Pa., a corporation of Delaware No Drawing. Application December 3, 1954, Serial No. 473,057

19 Claims. (Cl. 106—288)

This invention relates to a finely divided aluminum silicate suitable for use as a reinforcing pigment in rubber compositions, and also relates to a method of preparing the aluminum silicate.

It is known that desirable rubber products may be prepared by incorporating certain silicates, such as finely divided, precipitated calcium silicate of the proper particle size, into the rubber, and vulcanizing the mixture. Such silicates act as reinforcing pigments which improve the strength and abrasive qualities of the rubber compound. Calcium silicate suitable for this purpose may be prepared by reacting a calcium salt, such as calcium chloride, with an alkali metal silicate, such as sodium silicate, in the manner as disclosed in the U. S. Patent to Muskrat and Gage, No. 2,287,700. One difficulty with such calcium silicate is that it does not disperse well in rubber. Consequently, the rubber reinforced with this material often is observed to have white specks of undispersed pigment. This makes the product unsightly.

Attempts to produce an aluminum silicate with desirable pigment properties by reacting an aluminum salt with sodium silicate are more difficult since the aluminum silicate thus precipitated and dried is in the form of a glassy substance. Even when ground up or crushed by usual methods, the product thus obtained is made up of large agglomerate masses which are too coarse and too hard to permit satisfactory use in a rubber compound.

In accordance with this invention, an aluminum silicate has been prepared which possesses superior qualities for use in rubber compounding. The term "aluminum silicate," in the specification and the accompanying claims, is employed, unless otherwise specified, to designate an alumina-silica product such as produced as herein described, either free from other components or combined with other metallic components such as alkaline earth oxides and the like, for example, CaO in combination with $SiO_2$.

It has been found, according to this invention, that aluminum silicate may be prepared in a form which is finely divided and which is suitable for use as a rubber reinforcing pigment by several methods. According to one such method, a water soluble aluminum salt, such as aluminum chloride, is reacted in aqueous medium with finely divided, precipitated silicate of a metal of group II, series 3 to 8 of the periodic table of elements, such as calcium silicate having an average ultimate particle size below about one micron, preferably below 0.1 micron.

The composition of the product thus obtained depends upon the nature of the aluminum salt used and also upon the relative proportion of the salt to the calcium silicate or like alkaline earth metal silicate. Where the anion of the aluminum salt forms a water soluble salt with the alkaline earth metal, the calcium or like metal is solubilized in substantially stoichiometric proportions to the aluminum salt added. Thus, where aluminum chloride is used, the reaction probably proceeds according to the equation:

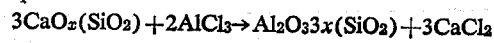

where $x$ denotes the initial molecular ratio of $SiO_2$ to CaO in the calcium silicate treated.

In general, the alkaline earth metal silicate subjected to treatment has the composition $MO(SO_2)_x$, where M is the metal of the silicate and $x$ is a number, including fractional numbers, between 2 and 5. It will be understood, however, that such silicates may be pretreated if desired with an acid, such as hydrochloric acid, which forms a water soluble salt of the metal of the silicate. This increases the ratio of $SiO_2$ to the metal and, in such a case, $x$ may be substantially higher than 5 although rarely above 10 to 15.

The amount of aluminum salt used should be enough to react with at least about 20 percent of the CaO or like metal in the alkaline earth metal silicate subjected to treatment. Where enough aluminum salt is used to decompose all of the calcium silicate $CaO(SiO_2)_{3.3}$, the product is largely the alumina-silica composition $Al_2O_3(SiO_2)_y$, where $y$ is substantially three times the ratio of moles of $SiO_2$ to moles of metal (for example, calcium) in the silicate subjected to treatment. Thus, a pigment is produced in which the mole ratio of $SiO_2$ to $Al_2O_3$ ranges from about 6 to about 100; the molecular ratio of $SiO_2$ to all metal oxides being in excess of 2, preferably above 3, and the mole ratio of $Al_2O_3$ to the sum of all other metal oxides being above 0.2.

Where less aluminum salt than the amount required to react with all of the calcium or like silicate is used, the product has the composition:

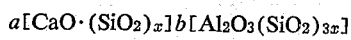

where the sum of $a$ and $b$ is one and $b$ is at least about 0.2, and $x$ denotes the initial ratio of CaO (or like alkaline earth metal oxide) to $SiO_2$.

For many purposes, only partial decomposition of the calcium silicate or like alkaline earth metal silicate is required in order to achieve improvement in properties. Hence, in the above formula, $a$ may range from about 0.1 to 0.7.

Aluminum salts which will extract calcium and which may thus be used include aluminum chloride, aluminum bromide, aluminum nitrate, aluminum acetate, and the like. Magnesium can be extracted by aluminum sulphate.

According to a further embodiment of the invention, the calcium silicate or like silicate is reacted with an aluminum salt which has an anion which forms a water insoluble salt of the alkaline earth metal, i. e., salts having a solubility below about 2 or 3 grams per liter. In such a case, a mixed pigment containing the alumina-silica pigment described above and the alkaline earth metal salt is produced.

A typical salt of this type is aluminum sulphate. When such a salt is used, the mixture comprises calcium sulphate and the alumina-silica pigment. Where the reaction mixture is relatively dilute, some calcium or even all may be extracted from the pigment due to the fact that calcium sulphate has a small solubility in water.

Other typical aluminum compounds of this type which may be used are aluminum nitrate, aluminum acetate, aluminum bromide, aluminum lactate, etc.

The particle size of the aluminum silicate is important. For most uses this material should have an average ultimate particle size less than one micron, and preferably not substantantially in excess of 0.1 micron. Such particles usually are present as flocs or loosely bound aggregates which can be broken up on milling with rubber.

The size of the resulting product is determined to a material degree by the particle size of the calcium silicate being treated. To obtain a pigment having the best pigment rubber reinforcing properties, the aluminum salt should be reacted with an alkaline earth metal silicate having an average ultimate particle size below about 0.1 micron (between 0.01 to 0.1 micron) as determined by an electron microscope.

Precipitation of calcium or other alkaline earth metal silicate in finely divided state, such as is herein required, may be accomplished by mixing a stream of aqueous calcium chloride (or other chloride of an alkaline earth metal) solution with a stream of aqueous sodium silicate solution under conditions which subject the mixture to a high degree of turbulence and almost instantaneous mixing. The amount of reactants in the respective streams is proportioned so as to obtain calcium silicate in the desired concentration and to establish an excess of calcium chloride over the stoichiometric quantity required to react with the silicate. One effective way to produce the required turbulence is to introduce the two streams closely together into a central area of a centrifugal pump. In this case, the agitation of the mixture is effected as the introduced streams of reactants are thrown radially outward by the pump rotor.

In most cases it is found desirable to limit the feed of calcium chloride and alkali metal silicate solutions entering the pump to an amount below the capacity of the pump. For example, if the pump is capable of discharging 100 gallons per minute, then the amount of reacting solutions applied to the pump is held to at least 10 percent below and usually to 35 percent or more below this amount. This appears to afford a greater degree of agitation of the reaction solutions and to ensure production of a calcium silicate having the desired particle size. Further, it is desirable to adjust the concentration of silicate and calcium chloride in the solutions so that calcium silicate will be prepared in a concentration approximately equal to about 5 to 250 grams of calcium silicate per liter of solution or slurry. Moreover, in order to ensure production of a calcium silicate having an extremely small particle size, an alkali metal silicate having the composition $Na_2O(SiO_2)_x$, where $x$ is a number not less than 2 nor more than 4, is preferably used. This results in the production of a calcium silicate having the composition $CaO(SiO_2)_x$, where $x$ is a number not less than 2 nor more than about 5. However, other calcium silicates, including mixed silicates of calcium and other metals such as sodium, potassium, and/or aluminum, where $x$ is higher or lower than this range, may be used according to the above described methods if desired.

Other silicates which may be used in lieu of calcium silicate are the corresponding barium, strontium, and magnesium silicates. These materials may be prepared by reacting the corresponding metal chloride with sodium silicate according to the method discussed above. Moreover, calcium silicate may be reacted with the corresponding metal chlorides of these metals and the resulting silicate reacted with an aluminum salt as herein described. Natural silicates, such as wollastonite, may be treated with aluminum salts as herein described. Mixed alkaline earth silicates, such as calcium aluminum silicates, and like calcium zeolites may be reacted with aluminum sulphate or chloride according to the herein described methods.

According to a further embodiment of the invention, calcium aluminum silicate suitable for use as a pigment may be prepared by reacting an alkali metal silicate with a water soluble aluminum salt in the presence of a water soluble salt of calcium or similar metal of group II, series 3 to 8 of the periodic table. Thus, the aluminum silicate-calcium silicate pigment may be precipitated directly by mixing a solution of a soluble aluminum salt, such as one of the salts mentioned above, and a water soluble calcium salt, with an aqueous solution of an alkali metal silicate, such as sodium silicate, preferably a silicate in which the $SiO_2$ to $Na_2O$ mole ratio is not less than 2. The mole ratio of calcium to aluminum salt initially provided may be varied from about 0.25 to 20 moles of aluminum per mole of calcium. This mixing is effected under conditions of vigorous agitation, and a typical method of effecting the reaction is the one described above with reference to the precipitation of calcium silicate. This process results in formation of the pigment in the desired finely divided state. Typical aluminum salts which may be used are aluminum chloride, aluminum nitrate, aluminum acetate, aluminum sulphate, and the like. Typical calcium or like salts useful in this embodiment are calcium, magnesium or barium chlorides, magnesium sulphate or the corresponding nitrates.

In accordance with a further embodiment of the invention, the pigment which is produced may be treated with a coating agent in order to improve certain of its properties. As an example, the pigment may be treated with coating agents, such as nondrying oils, for example, cocoanut oil, corn oil, lard, lard oil, sperm oil or tallow, and other coating agents, such as oleic acid, stearic acid, tall oil acids, and similar nondrying acids, or the alkali metal or ammonium soaps of these acids. The coating agent may be incorporated simply by forming an aqueous slurry of the resulting pigment and adding the coating agent thereto. After the addition, the mixture may be agitated, filtered, and dried in the usual manner.

The products produced as herein described are found to be very useful as rubber pigments, particularly for the reinforcement of elastomers or rubber compositions, including natural rubber compositions, synthetic rubber compositions, such as butadiene-styrene copolymers known as "GR–S" rubber, butadiene-acrylonitrile polymers, chloroprene rubber, butyl rubber, and like polymers of butadiene-1,3, isoprene, 2-chlorobutadiene-1,3, and 2,3-dimethyl butadiene-1,3, and copolymers thereof with styrene, acrylonitrile, and the like, as well as polyvinyl chloride, vinyl chloride-vinyl acetate copolymers, etc., and mixtures of natural and synthetic rubbers. The reinforced compositions produced exhibit superior qualities over those obtained where calcium silicate was used. The amount of such pigment incorporated in these rubber or elastomer compositions generally is about 10 to 100 parts by weight per 100 parts by weight of elastomer or rubber composition.

The invention may be more fully understood by reference to the following examples:

EXAMPLE I

An aqueous slurry of finely divided calcium silicate was prepared by introducing a stream of a solution of aqueous sodium silicate containing 10 grams of $SiO_2$ as $Na_2O.(SiO_2)_{3.36}$ per liter of solution and a stream of aqueous calcium chloride containing 10 grams of $CaCl_2$ per liter into a centrifugal pump, as described above. Sufficient calcium chloride was used to ensure an excess of at least 10 percent of calcium chloride over the theoretical amount required to react with the sodium silicate. The calcium silicate thus produced had an average ultimate particle size of about 0.03 to 0.05 micron.

This material was washed and thickened and then mixed with an aqueous solution of aluminum chloride in amount sufficient to provide 20 percent excess aluminum chloride over the stoichiometric amount required to react with all of the CaO in the calcium silicate. The mixture was held at a temperature of 160° F. for 2 hours. The excess chloride was then washed out and the remaining material was filtered on Büchner funnels, dried at 220° F., and pulverized. The chemical analysis of the aluminum silicate thus prepared was as follows:

| | Percent |
|---|---|
| $SiO_2$ | 69.5 |
| $Al_2O_3$ | 13.9 |
| $Fe_2O_3$ | 0.88 |
| CaO | 2.1 |
| NaCl | 0.2 |
| Ignition losses | 13.0 |
| $H_2O$ | 3.6 |

This pulverized material was compounded in GR–S rubber, using standard compounding procedures, according to the following recipe:

| | Parts by weight |
|---|---|
| GR–S | 100.0 |
| Zinc oxide | 5.0 |
| Sulphur | 4.0 |
| Santocure | 1.75 |
| Picco 100 | 10.0 |
| Agerite powder | 1.0 |
| Aluminum silicate | 82.8 |

The resulting compounds were milled into two separate sheets and cured for varying lengths of time at a temperature of 280° F. The rubber compound obtained by using the aluminum silicate pigment had tensile and tear strengths higher than those obtained using calcium silicate as a reinforcing pigment.

The compositions listed in the above formulations by trade name have chemical compositions as follows:

"Santocure"—N - cyclohexyl - 2 - benzothiazolsulfonamide
"Picco 100"—para cumarone-indene resin having a melting point of about 110 to 127° C.
"Agerite Powder"—phenyl beta-naphthylamine

EXAMPLE II

A stream of an aqueous solution of sodium silicate containing 100 grams of $SiO_2$ per liter as $Na_2O(SiO_2)_{3.36}$ and a stream of calcium chloride containing 100 grams per liter of solution were introduced into a centrifugal pump impeller, as described above, while proportioning the calcium chloride so that it remained at least 10 percent in excess. The slurry was washed to remove dissolved chloride. Samples of this slurry were reacted with aluminum chloride solution in amounts equal to 10 percent, 30 percent, 50 percent, 75 percent, and 100 percent of the theoretical amount required to react with all of the CaO in the calcium silicate. In these tests, the aluminum chloride was mixed in solution with the slurry and the mixture was allowed to stand for 4 hours at 160° F. The materials thus obtained had the following compositions:

*Table I*

| Sample No. | Ignition Loss (bound and free water) | $SiO_2$ | $Al_2O_3$ | CaO | Amount of $AlCl_3$ added Percent of Stoichiometric |
|---|---|---|---|---|---|
| | Percent by weight | | | | |
| 1 | 20.93 | 58.92 | 0.40 | 18.03 | None |
| 2 | 25.75 | 51.55 | 2.99 | 17.72 | 10 |
| 3 | 23.38 | 57.43 | 4.91 | 13.29 | 30 |
| 4 | 22.34 | 60.03 | 5.63 | 9.83 | 50 |
| 5 | 22.26 | 60.17 | 7.80 | 9.08 | 75 |
| 6 | 19.38 | 64.01 | 13.96 | 2.44 | 100 |

EXAMPLE III

An aqueous slurry containing ten pounds of finely divided calcium silicate having an average ultimate particle size of about 0.05 micron, as determined by an electron microscope, and having the composition $CaO \cdot (SiO_2)_{3.36}$, was thoroughly mixed with 4.44 pounds of aluminum sulphate in an agitating tank. After thorough mixing, the slurry was filtered and dried in a tray-type dryer, at a temperature of 100–125° C. The resulting aluminum silicate was a very fine white powder suitable for rubber compounding.

EXAMPLE IV

An aqueous slurry containing 100 grams per liter of finely divided calcium silicate having the composition $CaO(SiO_2)_{3.3}$ was prepared by mixing continuously flowing streams of sodium silicate and calcium chloride, each containing 100 grams per liter of reactant, in a pump as described above. The resulting slurry was titrated with an aqueous solution containing 10 percent by weight of aluminum sulphate to a greenish yellow color using bromothylmol blue as the indicator. The pH of such a slurry is about 7. During the titration, the temperature was maintained at 180° F. and the mixture was thoroughly agitated. Thereafter, the resulting product was filtered, washed with hot water, and dried at a temperature of about 100–125° C. The dry product was milled. The resulting product was found to be a fine, very white powder which, when dispersed in water, gave a slurry having a pH of about 5.7.

EXAMPLE V

The process of Example IV was repeated except that the titration with aluminum sulphate was effected at 75° F. The resulting product, when dispersed in water, gave a slurry which had a pH of 7.

EXAMPLE VI

A slurry was prepared containing 5 grams of finely divided calcium silicate having the composition $$CaO(SiO_2)_{3.3}$$

and was dried at 100–130° C. to the point where it contained about 5 percent by weight of bound water and about 5 percent by weight of free water, in 95 grams of water. To this slurry were added portions of 0.5 molar aluminum sulphate solution and, after each addition, the slurry was agitated at room temperature for about 5 minutes. Thereupon, the pH of the slurry was measured. The results were as follows:

*Table II*

| Grams of Aluminum Sulphate $Al_2(SO_4)_3$ Added | pH of Resulting Slurry |
|---|---|
| 0.00 | 10.18 |
| 0.352 | 8.40 |
| 0.528 | 8.23 |
| 0.704 | 8.02 |
| 0.880 | 7.88 |
| 1.056 | 7.80 |
| 1.408 | 7.30 |
| 1.760 | 5.75 |
| 2.112 | 4.10 |
| 2.464 | 3.88 |
| 2.816 | 3.65 |
| 3.168 | 3.60 |
| 3.520 | 3.55 |
| 3.872 | 3.53 |
| 4.576 | 3.50 |
| 5.280 | 3.45 |
| 6.512 | 3.40 |

EXAMPLE VII

A stream of an aqueous solution of sodium silicate containing 50 grams per liter of $Na_2O(SiO_2)_{3.36}$ and a stream of an aqueous solution containing 50 grams per liter of a mixture of calcium chloride and aluminum chloride (the mole ratio of calcium chloride to aluminum chloride in the solution being 1 to 1) were introduced into a centrifugal pump impeller as described above, proportioning the streams so that the metal chlorides were 10 percent in excess of stoichiometric. The slurry was filtered on a Buchner funnel and the filter cake dried at about 100° C. and pulverized. The resulting product contained 68.64 percent $SiO_2$, 7.31 percent $Al_2O_3$, and 8.01 percent CaO. The pigment was compounded in GR–S rubber using standard compounding procedures.

The rubber compound thus obtained had tensile and tear strengths substantially higher than those obtained using calcium silicate as a reinforcing pigment.

EXAMPLE VIII

A water slurry containing 10 pounds of finely divided calcium silicate having an average ultimate particle size of 0.05 micron, as determined by the electron microscope, and having the composition $CaO \cdot (SiO_2)_{3.36}$, was thoroughly mixed with 4.44 pounds of aluminum sulphate in an agitated tank. After thorough mixing, the slurry was filtered and dried in a tray-type dryer, at a temperature of 100–125° C. The resulting silicate product is a very fine white powder.

According to a further embodiment of this invention, the calcium silicate may be reacted with an aluminum salt and an acid. If the acid forms a water soluble calcium salt, the process produces a mixture of silica and aluminum silicate. Thus, $CaO(SiO_2)_{3.36}$ may be reacted with hydrochloric or like acid to extract one-fourth to one-half of the calcium therefrom and the resulting product reacted with aluminum chloride as described in Examples I and II, or with aluminum sulphate as described in Example III. These products have higher $SiO_2$ to $Al_2O_3$ molecular ratios, ranging as high as 7 or above, depending upon the amount of acid used.

Acids which form water insoluble salts of the calcium or like metal may be used. Thus, sulphuric or sulphurous acids may be added to react with up to 50 percent of the calcium silicate, and the resulting product treated as in Examples I, II, III or IV. Alternatively, the product obtained by reacting calcium silicate with 10, 30 or 50 percent of the theoretical amount of aluminum chloride, as described in Example II, may be further neutralized to pH 7 with sulphuric, sulphurous or like acids which form a water insoluble calcium salt. Products produced by this means constitute mixtures of silica, alumina, and the calcium salt of the acid used for the neutralization.

The above description has been directed primarily to embodiments of the invention wherein the calcium silicate is prepared by continuous mixing of flowing streams of sodium silicate and calcium chloride, and the calcium silicate has the composition $CaO(SiO_2)_x$, where $x$ is about 2 to 4. However, the calcium silicate of somewhat lower surface area produced by a batch process in which the sodium silicate is added to a pool of calcium chloride solution or vice versa also may be used. Best results have been obtained when the ratio of $SiO_2$ to $CaO$ in the calcium silicate exceeds 2, rarely being above 50 to 100. Nevertheless, calcium silicates such as wollastonite and like metasilicates may be treated according to this invention.

Moreover, other water insoluble white calcium silicates, including mixed silicates of calcium and other metals, may be used, particularly when the silicates have an average ultimate particle size below about 1 micron, preferably below 0.1 micron. Such silicates include calcium aluminum silicates, calcium sodium aluminum silicates, calcium potassium aluminum silicate, calcium zinc silicate, and like silicates in which the mole ratio of total $SiO_2$ to total $CaO$ in the product is not substantially greater than about 10. A typical mixed silicate of this type which recently has become available has the following composition:

| | Percent by weight |
|---|---|
| Ignition loss at 1000° C. | 16.7 |
| Loss on drying at 105° C. | 5.4 |
| $SiO_2$ | 46.1 |
| $R_2O_3$ (almost entirely $Al_2O_3$) | 10.88 |
| $Fe_2O_3$ | 0.24 |
| $CaO$ | 11.82 |
| $MgO$ | 0.38 |
| $Na_2O$ | 10.04 |
| Chloride | 0.04 |
| $SO_3$ | 3.8 |
| $CO_2$ | 6.6 |

Some portion of the CaO content of this product appears to be present as calcium carbonate.

The aluminum silicates prepared according to this invention are finely divided, soft, pulverulent, amorphous products having an average ultimate particle size below 0.1 micron, the major portion being 0.01 to 0.05 micron. The composition of such silicates is $Al_2O_3 \cdot (SiO_2)_y$, where $y$ is 6 to about 100, including fractional numbers. The surface area ranges from 25 to 200 square meters per gram, measured by the B. E. T. nitrogen absorption method of determination.

As shown above, the products may be, and frequently are, mixed with other salts such as calcium sulphate and the like. Quite often they also contain other metals such as calcium, zinc, barium, and the like, the presence of which are advantageous in order to maintain the basicity of the pigment. They are invariably amorphous.

The products normally contain 2 to 10 percent by weight of free water (water which can be driven off by heating at 105° C. for 24 hours) and 2 to 10 percent by weight of bound water, i. e., the water which is driven off upon heating to 1000–1200° C. minus the free water.

The aluminum silicate prepared according to the present invention is especially useful as a paper pigment since it markedly enhances the opacity and brightness thereof. It may be used advantageously in lieu of titanium dioxide in various cellulosic papers (kraft, sulphite pulps, and the like).

The following examples are illustrative:

EXAMPLE IX

Finely divided calcium silicate slurry prepared as in Example II was reacted with aluminum sulphate solution to a slurry pH of 4.8. The resulting product was filtered and washed free of chloride and then dried at 105° C. This product had a surface area of 104 square meters per gram.

The resulting product was ground to break up agglomerates and was slurried in water to produce a slurry containing 5 percent by weight of the aluminum silicate.

Bleached kraft pulp was beaten to 400 cc. freeness. A portion of this pulp slurry containing 1.5 percent by weight of pulp (on a dry basis) was mixed with the aluminum silicate slurry in the proportion of 10 parts by weight of the aluminum silicate per 100 parts by weight of pulp (dry basis). The mixture was thoroughly stirred for 3 minutes and the resulting slurry was treated to sheet, using a Noble Wood laboratory sheet machine. The resulting sheets were tested and compared to similarly prepared sheets without pigment, with the following results:

| | Ash, percent by weight | Opacity, percent | Brightness, percent |
|---|---|---|---|
| Sheets with aluminum silicate | 6.9 | 77.8 | 81.2 |
| Sheets without pigment | 0.3 | 62.1 | 77.0 |

EXAMPLE X

A pulp beater was charged as follows:

| | Grams |
|---|---|
| Unbleached sulphite pulp | 90 |
| Bleached kraft pulp | 180 |
| Hard white envelope cuttings | 90 |

This charge was dispersed in 23 liters of water and the resulting slurry was beaten in a Niagara beater for about 80 minutes to approximately 400 milliliters freeness, Canadian Standard (TAPPI Standard T227m50). One hundred milliliters of prepared rosin of about 5 percent by weight size was then added. Thereafter, 9 grams of pregelatinized starch was added and the pulp was circulated in the beater long enough to ensure complete mixing. Aluminum sulphate in the amount of 3 percent by weight, based on the dry weight of pulp, was added as a solution containing 12.92 grams of aluminum sulphate octodecahydrate per liter. At this stage, the pulp consistency was approximately 1.1 percent. Stirring was continued for 2 minutes. Immediately thereafter, the amounts of calcium silicate having the composition $CaO(SiO_2)_{3.3}$ and titanium dioxide indicated in the table were added. The amounts are expressed as percentages of the dry weight of the pulp. Stirring of the mixture was continued for 10 minutes more and the resulting stock was diluted to 8,000 milliliters, divided into ten 800 milliliter portions, and sheeted into paper. The paper was tested for brightness, opacity, bursting strength, weight and thickness, and ash and moisture content, with the following results:

Table III

| Sample Nos. | 1 | 2 | 3 | 4 | 5 | 6 |
|---|---|---|---|---|---|---|
| Percent titanium dioxide by weight | 1.0 | 0.5 | None | 1.5 | None | None |
| Percent calcium silicate by weight | 1.0 | 2.5 | 4.0 | None | 4.0 | None |
| Brightness: | | | | | | |
| Green light | 70.8 | 70.0 | 72.9 | 73.2 | 72.2 | 70.5 |
| Blue light | 61.2 | 62.2 | 63.3 | 63.4 | 63.1 | 59.3 |
| Contrast ratio (green light): | | | | | | |
| Reflectance, black backing | 56.9 | 57.0 | 57.0 | 57.9 | 57.3 | 53.0 |
| Reflectance, white backing | 79.0 | 80.1 | 81.1 | 80.6 | 79.7 | 79.6 |
| Ratio | 72.1 | 71.2 | 70.3 | 71.8 | 71.9 | 66.6 |
| Contrast ratio (blue light): | | | | | | |
| Reflectance, black backing | 53.7 | 53.9 | 54.5 | 54.9 | 54.7 | 49.9 |
| Reflectance, white backing | 66.8 | 67.9 | 69.3 | 68.6 | 68.3 | 66.9 |
| Ratio | 76.2 | 75.3 | 74.5 | 75.9 | 76.0 | 70.6 |
| Bursting Strength, lb./in.$^2$ | 32.0 | 34.5 | 33.0 | 33.6 | 35.0 | 35.0 |
| Percent ash in oven dry paper | 2.23 | 2.63 | 2.83 | 1.86 | 2.84 | 1.28 |

Comparison of paper pigmented with the calcium silicate-aluminum sulphate product of this invention (samples 3 and 5) with paper pigmented with titanium dioxide (sample 4) shows that about the same brightness and opacity is imparted by both pigments, and that both papers have about the same bursting strength. Hence, the relatively expensive titanium dioxide may be replaced with a reaction product of this invention at considerable saving in cost and without diminution of physical properties such as strength, brightness or opacity. Titanium dioxide may be used in the present process as in samples 1 and 2.

Although the present invention has been described with reference to the specific details of certain embodiments thereof, such details should not be regarded as limitations upon the scope of the invention except insofar as included in the accompanying claims.

This application is a continuation-in-part of applications Serial No. 770,169, filed August 22, 1947; Serial No. 277,760, filed March 21, 1952; and Serial No. 355,865, filed May 18, 1953.

What is claimed:

1. A method of preparing a product which comprises reacting in aqueous medium an alkaline earth metal silicate having an average ultimate particle size below about 1 micron with an amount of a water soluble aluminum salt which has an anion which forms a water soluble alkaline earth metal salt sufficient to react with at least 20 percent of the alkaline earth metal silicate and thereby to cause production of an alumina-silica pigment.

2. A method of preparing a product which comprises reacting an aqueous medium finely divided calcium silicate having an average ultimate particle size below one micron with a water soluble aluminum salt which has an anion which forms a water soluble salt with calcium in amount sufficient to react with at least 20 percent of the calcium silicate and to form an alumina-silica pigment and a water soluble calcium salt of said anion dissolved in said aqueous medium, and extracting the major portion of said soluble salt from the alumina-silica pigment.

3. A method of preparing aluminum silicate which comprises reacting in aqueous medium finely divided calcium silicate having a particle size below about 1 micron with aluminum chloride in amount sufficient to react with at least 20 percent of the calcium silicate.

4. The process of claim 1 wherein the aluminum salt is aluminum chloride.

5. A method of preparing an alumina-silica pigment which comprises reacting an alkali metal silicate with an alkaline earth metal chloride in aqueous medium and thereby precipitating the corresponding alkaline earth metal silicate having an average ultimate particle size below about 1 micron, and thereafter reacting the resulting alkaline earth metal silicate with enough water soluble aluminum salt having an anion which forms a water soluble alkaline earth metal salt to react with at least 20 percent of said silicate and to precipitate alumina whereby to produce a mixed alumina-silica pigment and a salt of said anion and the alkaline earth metal, and extracting a major portion of the alkaline earth metal salt from the pigment.

6. A method of preparing an alumina-silica pigment which comprises reacting an alkali metal silicate with an alkaline earth metal chloride in aqueous medium and thereby precipitating the corresponding alkaline earth metal silicate having an average ultimate particle size below about 1 micron, and thereafter reacting the resulting alkaline earth metal silicate with enough water soluble aluminum salt having an anion which forms a water soluble alkaline earth metal salt to react with substantially all of the alkaline earth metal silicate and to precipitate alumina whereby to produce a mixed alumina-silica pigment and a salt of said anion and the alkaline earth metal, and extracting a major portion of the alkaline earth metal salt from the pigment.

7. A method of preparing an alumina-silica pigment which comprises reacting calcium chloride with aqueous sodium silicate and thereby precipitating calcium silicate having an average ultimate particle size below 1 micron, and thereafter reacting the resulting calcium silicate with enough water soluble aluminum salt having an anion which forms a water soluble calcium salt to react with at least 20 percent of said silicate and to precipitate alumina whereby to produce a mixed alumina-silica pigment and a water soluble calcium salt of said anion, and extracting a major portion of the calcium salt from the pigment.

8. A method of preparing an alumina-silica pigment which comprises reacting aqueous sodium silicate with calcium chloride, thereby precipitating calcium silicate having an average ultimate particle size below 1 micron, and thereafter reacting the resulting calcium silicate with enough water soluble aluminum salt having an anion which forms a water soluble calcium salt to react with substantially all of the calcium silicate and to precipitate alumina whereby to produce a mixed alumina-silica pigment and a water soluble calcium salt of said anion, and extracting a major portion of the calcium salt from the pigment.

9. The process of claim 2 wherein the aluminum salt is aluminum chloride.

10. The process of claim 8 wherein the aluminum salt is aluminum chloride.

11. The process of claim 5 wherein the aluminum salt is aluminum chloride.

12. A method of preparing an alumina-silica pigment which comprises reacting in aqueous medium an alkaline earth metal silicate having an average ultimate particle size below about 1 micron with an amount of a water soluble aluminum salt having an anion which forms a water soluble alkaline earth metal salt sufficient to cause decomposition of at least 20 percent of the alkaline earth metal silicate with consequent production of an alumina-silica pigment and a calcium salt, and washing at least a portion of the calcium salt from the resulting alumina-silica pigment.

13. A method of preparing a product which comprises reacting in aqueous medium finely dixided calcium silicate having an average ultimate particle size below about 1 micron with a water soluble aluminum salt having an anion which forms a water soluble calcium salt in amount sufficient to react with at least 20 percent of the calcium silicate whereby to form an alumina-silica pigment and a calcium salt containing an anion of the aluminum salt, and removing at least a portion of said calcium salt from the alumina-silica pigment.

14. A method which comprises reacting a water soluble aluminum salt with finely divided alkaline earth metal silicate having an average ultimate particle size below one micron, the amount of said aluminum salt being at least sufficient to decompose at least 50 percent of the alkaline earth metal silicate and thereby to cause precipitation of $Al_2O_3$ and production of a precipitate comprising $Al_2O_3$ and $SiO_2$.

15. A method which comprises reacting a water soluble aluminum salt with finely divided alkaline earth metal silicate having an average ultimate particle size below one micron, the amount of said aluminum salt being at least sufficient to decompose substantially all of the alkaline earth metal silicate and thereby to cause precipitation of $Al_2O_3$ and production of a precipitate comprising $Al_2O_3$ and $SiO_2$.

16. The process of claim 14 wherein the aluminum salt is aluminum chloride.

17. The process of claim 15 wherein the aluminum salt is aluminum chloride.

18. The process which comprises reacting in an aqueous medium an aluminum salt with calcium silicate having an average ultimate particle size of 0.015 to 1 micron, the amount of said aluminum salt being sufficient to reduce the pH of the resulting slurry to a pH not substantially in excess of 7.

19. The process of claim 12 wherein the alkaline earth metal silicate is magnesium silicate.

References Cited in the file of this patent

UNITED STATES PATENTS

| | | |
|---|---|---|
| 1,017,912 | Rhodin | Feb. 20, 1912 |
| 1,347,191 | Thompson | July 20, 1920 |
| 1,652,141 | Endres | Dec. 6, 1927 |
| 1,920,340 | Baley et al. | Aug. 1, 1933 |
| 1,970,469 | Murphy | Aug. 14, 1934 |
| 2,237,374 | Smith | Apr. 8, 1941 |
| 2,314,188 | Allen | Mar. 16, 1943 |
| 2,674,541 | Wainer | Apr. 6, 1954 |

FOREIGN PATENTS

| | | |
|---|---|---|
| 8,235 | Great Britain | 1898 |

OTHER REFERENCES

Jacobson's "Encyclopedia Chem. Reactions," vol. I, page 118 (I-386), New York, 1946.